United States Patent [19]

Peters et al.

[11] Patent Number: 4,469,487
[45] Date of Patent: Sep. 4, 1984

[54] ARRANGEMENT FOR AND METHOD OF DOSING FUEL IN FLUIDIZED BED REACTOR

[75] Inventors: Werner Peters, Bochum; Harald Jüntgen; Karl H. Van Heek, both of Essen; Reinhold Kirchhoff, Hattingen; Heinrich Wagener, Bochum, all of Fed. Rep. of Germany

[73] Assignee: Bergwerksverband GmbH, Essen, Fed. Rep. of Germany

[21] Appl. No.: 481,380

[22] Filed: Sep. 20, 1982

[51] Int. Cl.³ .............................. C10J 3/50; C10J 3/60
[52] U.S. Cl. ........................................ 48/86 R; 48/77; 48/197 R; 48/DIG. 4; 201/9; 239/132.5; 239/139; 422/145; 422/146; 422/203
[58] Field of Search .................. 48/DIG. 4, 86 R, 77, 48/197 R; 422/145, 146, 203; 239/132.1, 132.3, 132.5, 139; 34/10, 57 A; 201/9, 39; 264/328.15; 425/549

[56] References Cited

U.S. PATENT DOCUMENTS

| 4,004,871 | 1/1977 | Hardy | 425/549 |
| 4,067,700 | 1/1978 | Switzer | 48/DIG. 4 |
| 4,218,287 | 8/1980 | Albright et al. | 201/9 |
| 4,282,010 | 8/1981 | Cherish et al. | 48/77 |
| 4,391,611 | 7/1983 | Haldipur et al. | 48/DIG. 4 |

Primary Examiner—S. Leon Bashore, Jr.
Assistant Examiner—K. M. Hastings
Attorney, Agent, or Firm—Michael J. Striker

[57] ABSTRACT

Fuels, particularly caking fuels, are supplied in a fluidized bed reactor by conveying a fuel through an injection pipe with an end provided with an injection nozzle in a fluidized bed reactor, conveying a fluid through a jacket pipe surrounding the injection pipe and having an end provided with a jacket nozzle, wherein the jacket pipe is interrupted prior to the jacket nozzle, as considered in the flow direction, and at a predetermined location, and bypassing by a heat exchanger at this location at which the jacket pipe is interrupted.

16 Claims, 7 Drawing Figures

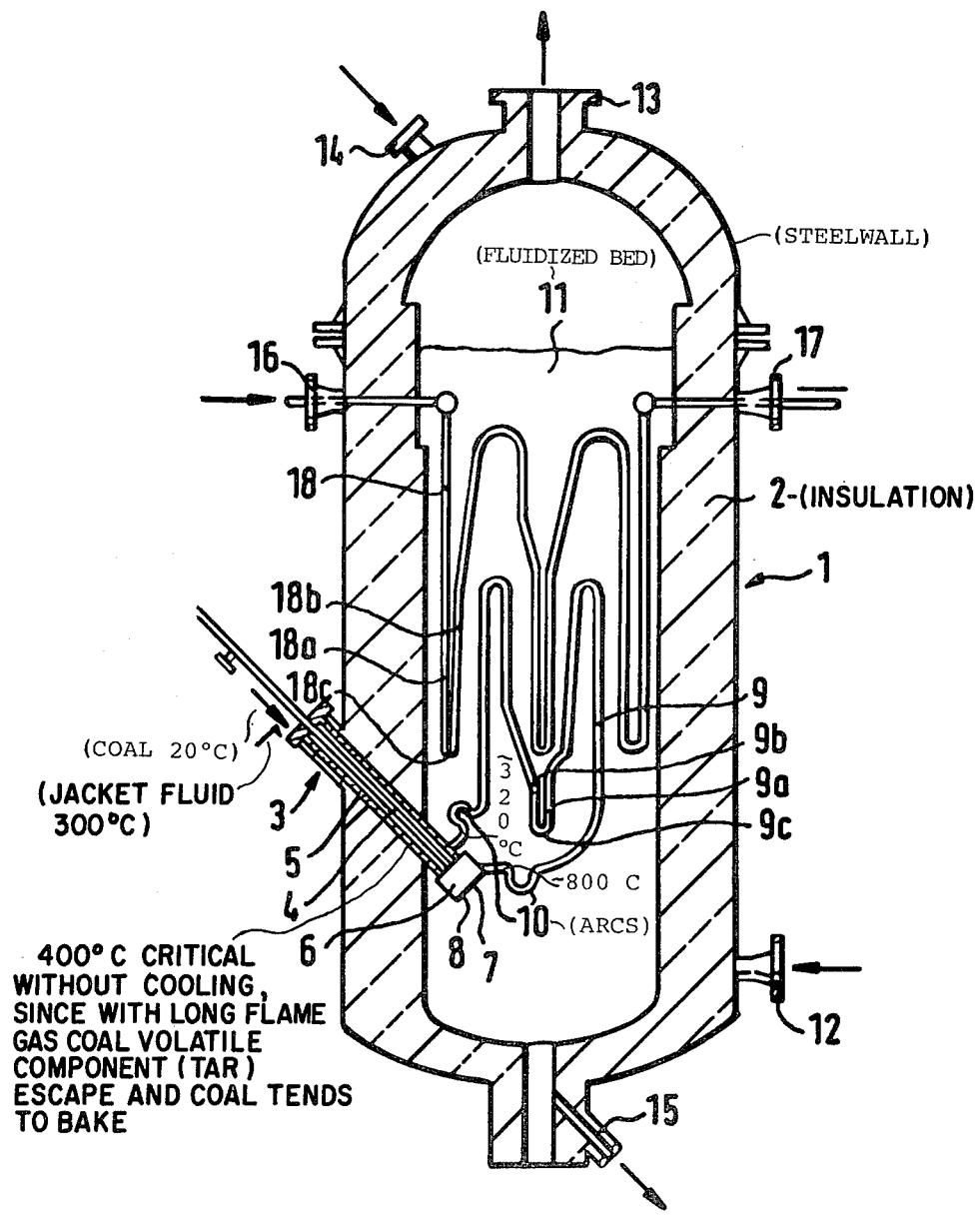
FIG. IA

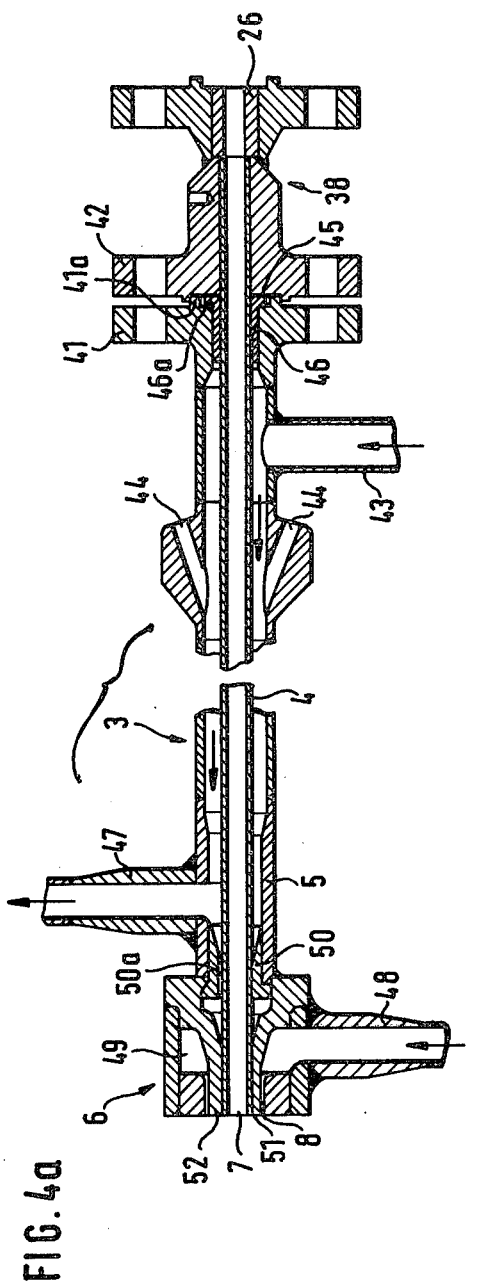
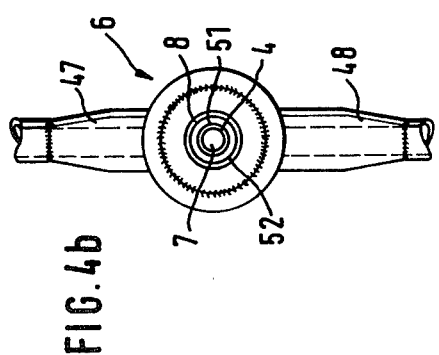
FIG. 4a
FIG. 4b

ARRANGEMENT FOR AND METHOD OF DOSING FUEL IN FLUIDIZED BED REACTOR

BACKGROUND OF THE INVENTION

The present invention relates to an arrangement for dosing, particularly caking fuels, in a fluidized bed reactor, in which an injection pipe for fuel supply is provided with an injection nozzle in the fluidized bed reactor and surrounded by a jacket pipe for a fluid supply (jacket fluid) provided with a jacket nozzle at its end. The invention also relates to a method of dosing fuels into a fluidized bed reactor.

Fluidized bed reactors are widely utilized in the field of utilization of fuels, and the fuels can be solids, liquids or gaseous. In such processes, combustion, degasification or liquefaction of fuels can take place. The fluidized bed reactor for these processes operates as a rule with a fluidized bed of an inert material, and the fuel to be treated is supplied in the reactor as continuously as possible, and the residues are sluiced out of the reactor. An injection supply is used in these cases as a suitable dosing technique. The fuel is conveyed through an injection pipe ending in the fluidized bed reactor with a suitable fluid, whereas so-called jacket fluid flows through a jacket pipe surrounding the injection pipe and enters at the same location at which the fuel through a jacket nozzle into the fluidized bed reactor. The jacket fluid cools the injection pipe and prevents starting of the fuel reaction prior to fuel entry into the fluidized bed. Moreover, the jacket fluid provides for good mixing of the fuel with the material available in the fluidized bed. It has been recognized that the above described injection supply device leads to practical results only conditionally, inasmuch as, first of all, in the event of fuels having a tendency to caking, such as for example some types of coal, the cooling with the jacket fluid must be so intensive that it unfavorably affects the temperature distribution in the fluidized bed. Otherwise there is a latent danger of clogging in the region of the dosing device.

SUMMARY OF THE INVENTION

Accordingly, it is an object of the present invention to provide an arrangement for dosing fuels in a fluidized bed reactor, which avoids the disadvantages of the prior art.

More particularly, it is an object of the present invention to provide an arrangement for dosing fuels in a fluidized bed reactor which guarantees a disturbance-free dosing process without unfavorably affecting the temperature distribution in the fluidized bed.

It is also an object of the present invention to provide a method which is particularly suitable for the inventive arrangement.

In keeping with these objects, and with others which will become apparent hereinafter, one feature of the present invention resides, briefly stated, in an arrangement for dosing fuels, particularly caking fuels, in fluidized bed reactor, which has an injection pipe for conveying a fuel and having an end provided with an injection nozzle, a jacket pipe for conveying a fluid and surrounding the injection pipe in the fluidized bed reactor and also having an end provided with a jacket nozzle, wherein the jacket pipe is interrupted prior to the jacket nozzle, as considered in the flow direction, and at a predetermined location, and a heat exchanger by-passes this location at which the jacket pipe is interrupted.

It is another object of the present invention to provide a method in which in bypass to a jacket fluid flowing through a heat exchanger an adjustable jacket fluid quantity cools the injection pipe to the jacket nozzle.

When the arrangement is designed and the method is performed according to the present invention, the fuel is supplied in the fluidized bed reacto-fast and in condition of intensive mixing with the fluidized material in the fluidized bed reactor without leading to agglomeration in the region of the fuel and without unfavorably affecting the temperature in the fluidized bed reactor. Moreover, a range of the introducible fuels or fuel mixtures is considerably increased.

It is possible in accordance with the present invention to cool the injection pipe extraordinarily intensively and thereby to provide in the region of the injection pipe opening a jacket fluid with a sufficiently high temperature without leading to formation of agglomerates of the fuel.

In accordance with another feature of the present invention, it is especially advantageous for the temperature distribution in the fluidized bed to locate the heat exchanger in the fluidized bed. Thereby the jacket fluid in the region of the jacket nozzle has substantially the temperature of the fluidized bed.

Still another feature of the present invention, which is recommended for high working temperatures in the fluidized bed reactor, is that the heat exchanger located inside the fluidized bed is formed wave-shaped and arranged in a suspended position, whereas so-called lyre-shaped arcs can be arranged at least at the ends of the heat exchanger to guarantee an elasticity between the heat exchanger and the dosing arrangement.

Yet another feature of the present invention, which provides for an especially intensive mixing of the fuel with the fluidized material, is that the injection pipe and the jacket pipe are connected via a ring-shaped rim with the jacket nozzle composed of at least one opening. With the utilization of several openings, they can be arranged in different directions relative to the direction of the injection pipe to further increase the mixing effect.

A further feature of the present invention, provided for eliminating thermal stresses between the injection pipe and the jacket pipe, is that the jacket pipe at its end opposite to the jacket nozzle is axially displaceable relative to the injection pipe. The thus produced sliding location must be movably sealed against the jacket fluid or the delivery fluid for the fuel, for example by utilization of suitable sealing elements such as O-rings or the like.

Supply of the jacket nozzle with the jacket fluid which has passed through the heat exchanger is improved and made uniform when, in accordance with still a further feature of the present invention, a ring-shaped buffer chamber is arranged between the outlet-side hot end of the heat exchanger and the jacket nozzle around the injection nozzle. The buffer chamber is provided in immediate proximity to the jacket nozzle.

The problem of different heat expansion of the injection pipe and the jacket pipe can be solved in accordance with a further feature of the present invention especially advantageously by an annular nozzle which surrounds the injection pipe in the region of the injection nozzle for the jacket fluid in bypass to the heat exchanger. By the heated annular nozzle, a free gap for force-transmitting connecting pieces is provided between the injection pipe and the jacket pipe, so that the different heat expansions can be absorbed without problems. Moreover, the jacket gas flowing in bypass to the heat exchanger through the annular nozzle acts so that the heated gap cannot be obstructed with fluidized material, fuel, and the like. A guide bush for sliding guidance between the injection pipe and the jacket pipe provides for stability of the arrangement. The jacket gas can flow through, for example, axially arranged grooves in the guide bush.

The maintenance and the building-in of the inventive dosing arrangement is facilitated when, in accordance with an additional feature of the present invention the jacket pipe is gas-tight at its end opposite to the jacket nozzle relative to the injection pipe, and is separable with the aid of a gas-tight coupling from the supply conduit for the fuel.

When the fuel must be provided prior to its dosing in the fluidized bed reactor with additional material, for example catalysts, it is recommended in accordance with the present invention to provide, prior to the entrance of the jacket fluid into the jacket nozzle, a mixing chamber for the additional material with the fuel.

Supply of the jacket pipe with the jacket fluid can be improved particularly in the event of the above mentioned bypass in connection with an annular nozzle, when in accordance with the present invention at least one temperature-measuring nipple is arranged in the wall of the jacket pipe. In some cases, measuring devices for the pressure and throughput of the jacket gas are provided.

Still an additional feature of the present invention, which facilitates dosing of the fuel with the inventive arrangement, is that in the supply conduit for the fuel a branched conduit for the delivery fluid with branches in supply and opposite directions opens, so as to form a control triangle.

Because of the control triangle for a cyclical supply of fuel from a supply bin with a relatively small amount of delivery gas, and in comparison with this a high fuel part (tight stream supply), it is guaranteed that in relatively small fluidized bed reactors the fluidized bed is not locally supplied with excessive quantities of fuel and thereby destroyed. In fluidized bed reactors with great fuel throughput and/or during utilization of caking fuel particles, it is required to provide so great a cross section for the fuel supply conduit that, with cyclical operation and tight stream supply during the cycle, excessive fuel quantities flow in the fluidized bed and destroy the same. In such cases, a continuous thin stream supply is advantageous, during which a uniform, continuous supply of the fluidized bed with a relatively small quantity of fuel and a relatively great quantity of the delivery gas takes place. The supply is performed from a supply bin and is especially advantageous when the bin has an upper storage chamber and a lower supply chamber separated by a sluice, with a gas distributor in the lower region of the supply chamber and a delivery fluid conduit extending from the upper region of the storage chamber into the supply chamber.

A further elimination of disturbances in lower and upper regions of the fluidized bed is obtained when the heat exchanger is located in the fluidized bed and composed of forward and return pipes vertically extending in pairs and having tightly extending pipe portions connected with each other. It has been recognized that the vertical heat exchange pipes uniformly distributed over the cross section of the fluidized bed reactor and having upper and lower reversing arcs of 180° lead to local undesirable increases and decreases of the fluidizing gas. When the lower, and in some cases the upper, heat exchange pipes connected with one another are arranged tight near one another at least in their end regions and connected by a short pipe connector so that the reverse radius of the 180° connection has the value of the outer diameter of the heat exchange pipe, the above mentioned flow disturbances no longer take place, without worsening the heat transmission properties between the heat exchanger and the fluidized material. It is to be understood that the heat exchange pipes outside the above mentioned end region can extend inclined from one another and together with one another, and this angle can be selected not insignificantly great.

During the operation of the inventive arrangement it is recommended that the injection pipe, in the event of interruption of the fuel supply, be supplied with a fluid, for example the delivered fluid, in the supply direction. Thereby first of all the entrainment of the material from the fluidized bed reactor in the injection pipe is eliminated, and furthermore the start of the supply is facilitated. When mixing of the fuel with additional materials is recommended, the additional material is utilized in a form dissolved in the jacket fluid. The supplied quantities of fuel can be controlled especially simply when, in accordance with the invention, the supply conduit is supplied opposite to the supply direction with fluid stream which has a thickness corresponding to that of the desired supplied quantity.

It is especially advantageous when, in accordance with the present invention, the fuel dosing is performed in a cycle both for the distribution of the fresh fuel dosed in the reactor and also for the provision of technically best supply conditions of the fuel during dosing.

Flexibility of the inventive dosing of fuels in the fluidized bed reactor is improved in accordance with the present invention when, in bypass to a jacket fluid flowing through a heat exchanger, an adjustable jacket fluid quantity cools the injection pipe to the jacket nozzle. It is thereby prevented that the jacket gas heated by heat transfer in the heat exchanger can form in the region of the injection nozzle agglomerates of the fuel, and the like, without undesirably affecting the temperature supply in the fluidized bed reactor.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1a is an enlarged view of a portion of the fluidized bed reactor showing the location of a heat exchanger in accordance with the invention;

FIG. 2b is a plan view of the reactor-side end face of the dosing arrangement of FIG. 2a;

FIG. 4a is a longitudinal section of the inventive dosing arrangement with a nozzle head; and FIG. 4b is an end-side plan view of the nozzle head of the dosing arrangement of FIG. 4a.

DESCRIPTION OF A PREFERRED EMBODIMENT

Figure 1:
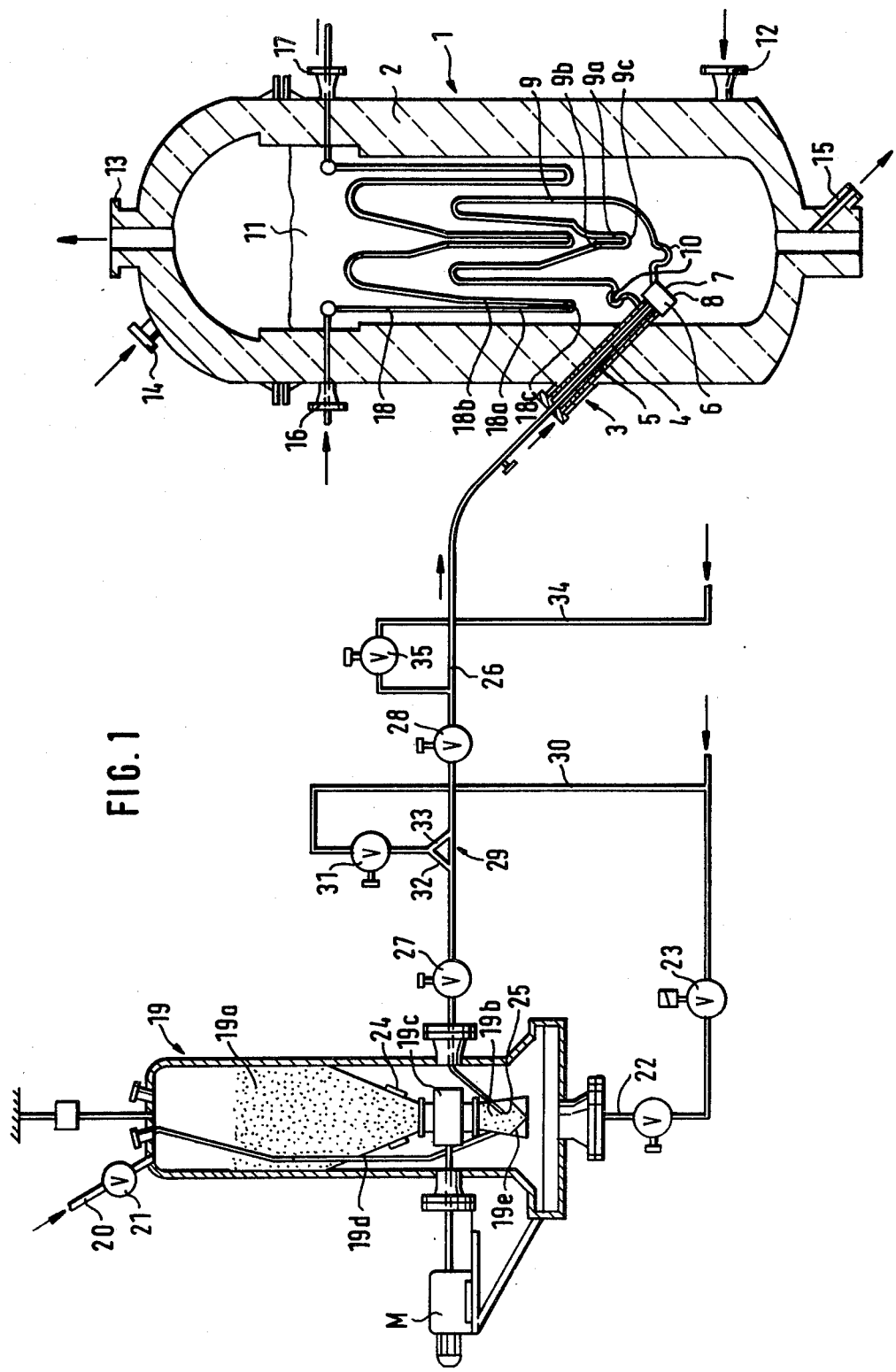
FIG. 1 is a view schematically showing a fluidized bed reactor with a dosing arrangement in accordance with the present invention.

FIG. 1 shows a fluidized bed reactor which is identified by reference numeral 1 and may have an insulated casing 2. This fluidized bed reactor is suitable, for example, for degasification of coal.

Supply of coal is performed via a dosing arrangement 3 with an injection pipe 4 for supplying the coal and a jacket pipe 5 for supplying a jacket fluid and arranged so that the jacket pipe concentrically surrounds the injection pipe in its reactor-side end region. The dosing arrangement 3 has a nozzle head 6 located inside the fluidized bed reactor 1. A dosed fuel exits from the nozzle head 6 with its delivery fluid through a injection nozzle 7, and the jacket fluid exits from the nozzle head 6 through a jacket nozzle 8. The jacket pipe 5 is interrupted shortly before the nozzle head 6 with the jacket nozzle 8 as considered in a flow direction. Thereby a relatively small quantity of the jacket fluid can travel directly through an aperture nozzle 51 shown in FIGS. 4a and 4b. The main stream of the jacket fluid is branched prior to the location of interruption, as considered in the flow direction, and is supplied through a meander-shaped heat exchanger 9 suspended in the fluidized bed reactor 1, whereupon it is again supplied to the jacket pipe 5, for example in the region of the nozzle head 6 shortly before the jacket nozzle 8. Lyre-shaped arcs 10 are provided at least at the ends of the heat-exchanger 9 to guarantee an elasticity between the heat-exchanger 9 and the dosing arrangement 3. A fluidized layer 11 composed of for example a substantially inert material is supported in the fluidized reactor in a fluidized condition by a fluidizing fluid, for example vapor, supplied via a not shown perforated bottom. The fluidizing fluid flows through a connecting pipe 12 into the fluidized bed reactor 1 and leaves the same together with the reaction gas (raw gas) via an outlet pipe 13. In addition to the fuel supplied through the dosing arrangement 3, a further fuel such as for example anthracite and/or low-temperature coke is supplied via a connecting pipe 14 into the fluidized bed reactor 1. Residual products from the use of the fuel in the fluidized bed reactor 1 can be withdrawn, for example in the bottom region of the fluidized bed reactor, via an outlet pipe 15. The fluidized bed 11 can be heated with hot helium via a heat exchanger 18 (cooler) acting through connecting pipes 16 and 17.

Both the heat exchanger 18 and the heat exchanger 9 can be designed in the region of their upper and/or lower 180° arcs between supplying and withdrawing heat exchange pipes in a special way, as shown in FIG. 1 for respective reversing locations, for a purpose which will be explained further below. The supply and the return pipes 9a and 9b, or 18a and 18b, at least in their lower or upper end regions prior to the 180° reverse, approach each other first at a minimum possible angle, are directly connected with one another at their reversing points by a pipe connector 9c or 18c with a reverse radius corresponding to the value of the pipe outer diameter of the heat exchange pipe. This connection can be box-shaped, pipe arcuate-shaped, or of other suitable type. It is however desirable that the cross-sectional area of the heat exchanger 9 or 18 in the region of its lower, or in some cases also in the region of its upper 180° reverse points, is not increased by the used reversing arcs with great bending radius.

The dosing arrangement 3 in FIG. 1 extends at an angle of approximately 30° relative to the vertical into the fluidized bed reactor 1, and the nozzle head is located at a height of approximately ½ meter above the apertured bottom of the reactor. In dependence upon the particular application, it is also possible that the dosing arrangement extend in any suitable direction relative to the fluidized bed reactor. It is also possible, as not shown in the drawings, that a mixing chamber for an additional material is provided at any suitable location of the conduit system for the jacket fluid. During degasification of coal with utilization of vaporous catalysts, such a mixing chamber is especially recommended in the region of the heat exchanger 9 and advantageously in the region of its gas outlet end. It is especially to dissolve the catalysts in vapor with high pressure and to carry out with the aid of a further heat exchanger inside the fluidized bed reactor 1 the dissolution of the catalyst with a heat supply and with release of pressure acting upon the fluidized bed.

The supply of the fuel can for example be performed, when the fluidized bed reactor deals with solid grain material, with the aid of a supply bin 19 which is filled without pressure with the fuel via a connecting pipe 20. More particularly, after closing a filling valve 21, the supply bin 19 is placed, for example via a conduit 22, under a supply pressure, wherein a valve provides for pressure regulation. For providing the above mentioned thin flow the supply bin 19 is subdivided into an upper storage chamber 19a and a lower supply chamber 19b separated by a sluice 19c which is advantageously formed as a cellular wheel sluice driven by a motor M with an adjustable rotary speed. The delivery fluid flows via a connecting pipe 22 arranged at a suitable location into the supply bin 19 and from there flows via a gas distributor 24 to pass through the same with loosening of the material therein, so as to facilitate its entry into the cellular wheel sluice. This gas accumulates above the filling limit in a dome from which it flows via a delivery fluid conduit 19d as steeply as possible below into the supply chamber 19b. The latter has at its lower end a funnel 19e with a trough-shaped closed lower end for receiving an open end 25 of a supply conduit 26. The delivery gas flows through a nozzle gap between the open end 25 and the trough in the funnel 19e, together with a predetermined, relatively small quantity of fuel upwardly in the supply conduit 26. It is also possible to connect the supply conduit 26 in a falling position, as not shown in the drawing, to the open end of the funnel 19e and to blow an additional delivery air downwardly into the funnel.

For protecting an armature 28 for blocking the fuel stream, whereas an armature 27 is always opened as a not closing armature, a control triangle 29 is introduced in the supply conduit 26 prior to the armtaure 28. The delivery gas controlled via a conduit 30 with the aid of a valve 31 acts in conduit branches 32 and 33 of the control triangle 29. The conduit branches 32 and 33 open in a substantially opposite or the same direction relative to the delivery gas stream in the supply conduit 26, and with respectively selected action of the delivery gas serve for retaining the supply conduit 26 to full opening or closing of the armature 28 free from solid particles. Naturally, the fuel stream can be interrupted in any desired time by such a control triangle in connection with valves 31 and 23, whereby for example a cyclical dosing in the fluidized bed reactor is possible. When the fuel supply is interrupted, the supply conduit 26 can be provided with an auxiliary gas via a conduit 34 with a valve 35, to prevent entrainment of the fluidized material from the fluidized bed reactor 1 into the supply conduit 26.

Figure 2A:
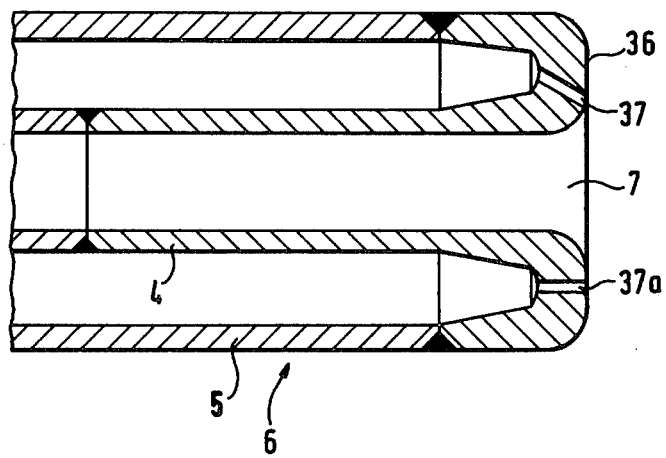
FIG. 2a is a longitudinal section of a reactor-side end of the dosing arrangement in accordance with the invention.
Figure 2B:
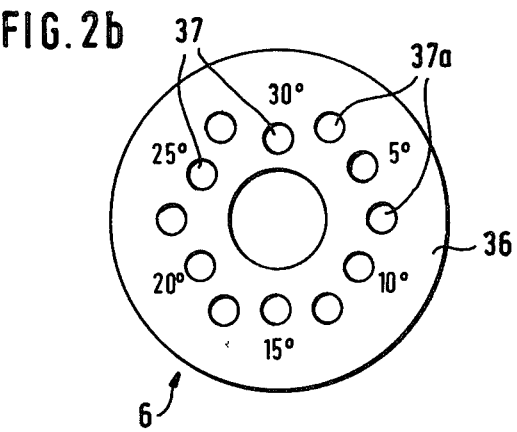

In the nozzle head 6 shown in FIGS. 2a and 2b, the injection pipe 4 and the jacket pipe 5 are connected at their reactor-side ends by a ring-shaped rim 36 with the jacket nozzle 8 formed as openings 37 and 37a. The inner region enclosed by the rim 36 forms the injection nozzle 7. Advantageously a part of the openings 37a in a supply direction and the remaining part of the openings are arranged at a predetermined different angle to the supply direction. For example, the angle of inclination in FIG. 2b increases from 5° to 30° on the supply stream, which provides for an especially intensive distribution of the fuel in the fluidized bed.

Figure 3:
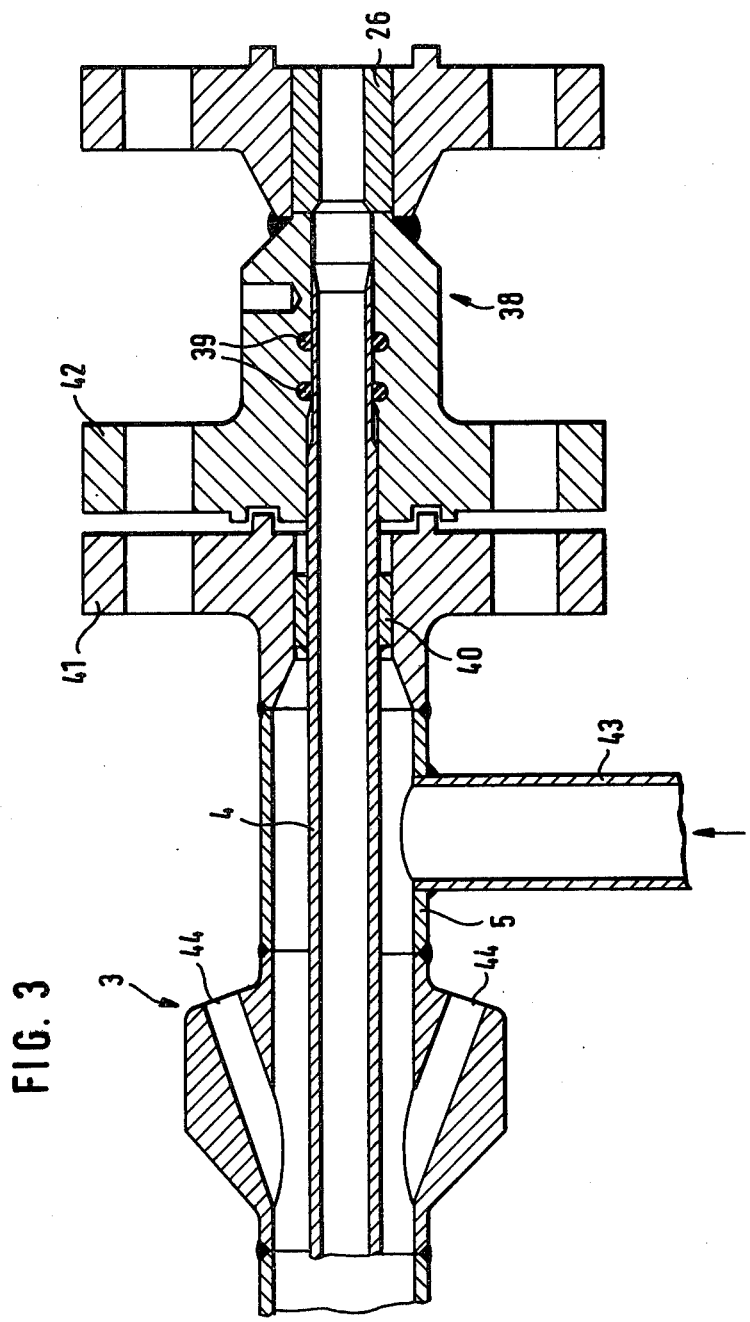
FIG. 3 is a longitudinal section of a jacket pipe in the region of its end facing away from the reactor.

As can be seen from FIG. 3, the injection pipe 4 is displaceably arranged in a gas-tight manner inside an end 38 of the jacket pipe 5, the end being opposite to the jacket nozzle 8. There are an O-ring 39 for tightness and a guide bush 40 for the injection pipe 4, and also flanges 41 and 42 for removal of the dosing arrangment 3 from the supply conduit 26. The jacket fluid is supplied via a connecting pipe 43 in the jacket pipe 5, and the jacket pipe 5 is provided with a temperature-measuring nozzle 44 for supplying a temperature, and also with pressure-measuring elements.

FIG. 4a substantially corresponds in its right half to FIG. 3, but the displaceability between the injection pipe 4 and injection pipe 5 is dispensed with. A guide bush 46 between the injection pipe 4 and the flange 41 is supported with a projection 46a against the flange 41, on the one hand, and together with projection 41a against a flange seal 46. Thereby a gas-tight closure between the jacket pipe 5 and the injection pipe 4 is provided, on the one hand, and the separability of the dosing arrangment 3 from the supply conduit 26 is guaranteed, on the other hand.

The left part of FIG. 4a shows the separation location between the jacket pipe 5 and the jacket nozzle 8 together with the nozzle head 6. The jacket fluid leaves the jacket pipe 5 in its greater part via an outlet pipe 47 and after flowing through the not shown heat exchanger 9 is supplied back via a connecting pipe 48 to the nozzle head 6. It is there distributed via an annular chamber 49 and further leaves through the jacket nozzle 8 the nozzle head 6. The separation location in the jacket pipe is carried out behind the outlet pipe 47, as considered in the flow direction, by a guide bush 50 between the jacket pipe 5 and the injection pipe 4. It provides for a relative movement between both pipes in an axial direction and has several, for example adjustable, slots 50a for flowing a predetermined quantity of the jacket fluid. The jacket fluid cools the last part of the injection pipe 4 and leaves the nozzle head 6 through an aperture nozzle 51 between the injection pipe 4 and an injection pipe-side border 52 of an annular chamber 49 of the nozzle head 6. Penetration of the fluidized material into the aperture nozzle 51 is simultaneously prevented by this jacket fluid stream, so that the passage between the jacket pipe 5 and the injection pipe 4 cannot be obstructed.

EXAMPLE

In a coal gasification installation in accordance with FIG. 1, with a dosing arrangement in accordance with FIGS. 4a and 4b approximately 0.34 t of charging coal is gasified per hour with a pressure of 40 bar and a temperature of 820°-850° C. with the aid of 1400 kg/h water vapor as fluidizing gas. As a result, 0.1 t/h of residual product (substantially minerals) as well as 816 $m^3$ of raw gas (in standard conditions) are produced with a composition $CH_4$: 14.9 vol.-%

$H_2$: 46.8 vol.-%

CO: 15.5 vol.-%

$CO_2$: 22.8 vol.-%

The fluidized bed reactor 1 is cylindrical and has an inner diameter of approximately 800 mm. Through a suspended helium heat exchanger with a heat exchange surface of 34 $m^2$ 20,000 $m^3$ helium/h in standard conditions. In fluidized condition, the fluidized bed height above the apertured bottom amounts to 4,000 mm, and the fluidized material is substantially composed of partially gasified coal with an average grain size of 0.25 mm. By the dosing arrangement the fluidized bed reactor 1 is supplied with 0.35 t/h of a caking coal with the following composition:

gas flame coal, volatile component 35 wt.-% (water and ash-free) 100%: <1.0 mm.

The injection pipe has an inner diameter of 10 mm with a wall thickness of 2 mm, whereas the jacket pipe has an inner diameter of 28 mm with a wall thickness of 3.2 mm. The heat exchanger 9 is composed of suspended meander-shaped pipe with an inner diameter of 16 mm and an outer surface of approximately 3 $m^2$. The injection nozzle has a diameter of 10 mm and the jacket nozzle has an inner diameter of 22 mm with a nozzle slot width of 0.8 mm. The nozzle head has an inner diameter of 60 mm and the same length. For connection of the heat exchanger 9 to the dosing arrangement 3, lyre arcs are provided at both ends with a diameter of curvature of 250 mm. The annular chamber 49 (buffer chamber) has an inner diameter of 22 mm and an outer diameter of 48 mm, and length of 40 mm. The aperture width of the aperture nozzle 51 amounts to 0.5 mm, and the aperture 50a in the guide bush 50 is adjustable and has an aperture width of 0.1 mm.

Water vapor is used as the jacket fluid and flows through the jacket pipe with 250 kg/h with a temperature of 280° C. and a pressure of 46 bar. 95% of the jacket fluid flows through the heat exchanger 9, whereas 5% flows in bypass through the aperture 50a and the aperture nozzle 51 directly into the fluidized bed reactor 1. The jacket fluid enters the pipe 48 with a temperature of approximately 815°-845° C.

The proposed arrangement eliminates caking of the dosed coal, provides for its uniform distribution in the fluidized bed reactor, and avoids undesirable temperature influences of the latter.

Nitrogen, and alternatively product gas, are used as a delivery gas with a temperature of 20°-190° C. and a pressure of 44 bar. During the supply pauses, for example in the cyclical operation, an auxiliary gas is supplied with the same condition with a stream of approximately 50 $m^3$/h in standard condition through the supply end injection pipe. By suitable adjustment of the valves 23 and 31, the fuel supply can be regulated in a wide range, and also promptly turned on or turned off.

During the starting phase the fluidized bed reactor 1 is supplied via the connecting pipe 14 per hour with 0.34 t (anthracite and/or low-temperature coke) with grains of 100% <1.0 mm. As soon as the reactor is filled with such a starting material, the supply of the gas flame coal via the dosing arrangement 3 with interruption of dosing of anthracite and low-temperature coke, starts.

It will be understood that each of the elements described above, or two or more together, may also find a useful application in other types of constructions differing from the types described above.

While the invention has been illustrated and described as embodied in an arrangement for dosing fuels, particularly caking fuels, in a fluidized bed reactor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for dosing fuels, particularly caking fuels, in a fluidized bed reactor, comprising an injection pipe for conveying a fuel and having an end provided with an injection nozzle; a jacket pipe for conveying a fluid and surrounding said injection pipe in the fluidizied bed reactor, said jacket pipe having an end provided with a jacket nozzle located in the reactor, said jacket pipe being interrupted prior to said jacket nozzle as considered in a flow direction and at a location juxtapositioned to said jacket nozzle and a heat exchanger bypassing said location at which said jacket pipe is interrupted and conveying the fluid.

2. An arrangement as defined in claim 1, wherein said heat exchanger is arranged in a suspended wave-shaped form.

3. An arrangement as defined in claim 1, wherein said heat exchanger has ends and is provided with a lyre-shaped arc portion at the end closest to the jacket nozzle.

4. An arrangement as defined in claim 1, wherein said jacket nozzle has means defining an opening, said injection pipe and said jacket pipe having at their ends a ring-shaped rim connected with said means defining said opening of said jacket nozzle.

5. An arrangement as defined in claim 1, wherein said jacket pipe has an end opposite to said jacket nozzle and is axially offset at said opposite end relative to said injection pipe.

6. An arrangement as defined in claim 1, wherein said heat exchanger has a hot end; and further comprising an annular distribution chamber arranged between said hot end of said heat exchanger and said jacket nozzle around said injection pipe.

7. An arrangement as defined in claim 1; and further comprising an annular aperture nozzle surrounding said injection pipe in the region of said injection nozzle for a fluid conveyed in bypass to said heat exchanger.

8. An arrangement as defined in claim 1, wherein said jacket pipe has an end opposite to said jacket nozzle and is sealed at said opposite end relative to said injection pipe; and further comprising a supply conduit for a fuel, and means for gas-tight coupling separating said jacket pipe from said supply conduit.

9. An arrangement as defined in claim 1, wherein said jacket nozzle has an inlet for said jacket pipe; and further comprising a mixing chamber arranged in a gas-tight manner prior to said inlet and supplied with additional material.

10. An arrangement as defined in claim 1, wherein said jacket pipe has a wall and at least one temperature-measuring nipple arranged in said wall of said jacket pipe.

11. An arrangement as defined in claim 1; and further comprising a supply pipe for a fuel, and a fluid conduit having two branches opening in said supply pipe in a supply direction and in an opposite direction.

12. An arrangement as defined in claim 1; and further comprising a supply bin for a fuel with a conduit for a delivery gas, a conduit for a fuel, and a storage chamber, a supply chamber, a supply conduit communicating with said supply chamber, and a sluice separating said chambers from one another.

13. An arrangement as defined in claim 12, wherein said storage chamber has a lower outlet region, said supply chamber having an upper region; and further comprising a gas distributor provided in said lower region of said storage chamber, and a delivery fluid conduit extending from said upper region of said supply chamber into said storage chamber.

14. An arrangement as defined in claim 12, wherein said supply chamber has a funnel and means defining a lower funnel opening, said supply conduit having means defining an open end which communicates with said means defining a lower funnel opening.

15. A method of dosing fuels, particularly caking fuels, in a fluidized bed reactor, comprising the steps of conveying a fuel through an injection pipe having an end provided with an injection nozzle; conveying a fluid through a jacket pipe surrounding said injection pipe in the fluidized bed reactor and having an end provided with a jacket nozzle located in the reactor; interrupting said jacket pipe prior to said jacket nozzle as considered in a flow direction and at a location juxtapositioned to said jacket nozzle; and providing a heat exchanger bypassing said location at which said jacket pipe is interrupted and conveying the fluid.

16. A method as defined in claim 15; and further comprising the step of cooling the injection pipe to the jacket nozzle by an adjustable quantity of fluid in bypass to the fluid conveyed through said heat exchanger.

* * * * *